United States Patent Office 3,547,925
Patented Dec. 15, 1970

3,547,925
CONDITIONING PROCESS FOR PRODUCING GAMMA PHASE QUINACRIDONE
Anthony P. Wagener, Chicago, Ill., assignor to The Sherwin-Williams Company, Cleveland, Ohio, a corporation of Ohio
No Drawing. Filed Aug. 7, 1967, Ser. No. 658,614
Int. Cl. C07d 37/00
U.S. Cl. 260—279    9 Claims

ABSTRACT OF THE DISCLOSURE

This invention comprises a process for "conditioning" quinacridone to produce the conditioned gamma phase by milling alpha or gamma crude quinacridone with an inorganic salt such as sodium chloride, in the presence of pyridine or a homolog thereof and at room temperature or above, advantageously above 50° C. and preferably in the range of 75–100° C. This conditioned gamma phase is red in color and has a characteristic X-ray diffraction pattern distinguishing it from other forms of quinacridone.

---

This invention relates to a process for the production of gamma phase quinacridone. More specifically it relates to a process for "conditioning" crude quinacridone in the alpha or gamma crystal phase as obtained from the condensation reaction by which it is prepared. Still more specifically, it relates to a process of conditioning linear quinacridone by milling the quinacridone with an inorganic salt and pyridine preferably at a raised temperature.

It has been known that linear quinacridone which is represented by the following structural formula:

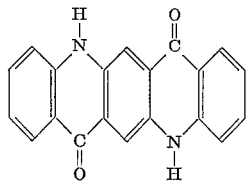

can be produced as pigments in a number of crystal phases which exhibit different X-ray diffraction patterns. While other crystal phases are known, the alpha, beta and gamma phases are more common.

One alpha phase in small particle size is defined by X-ray diffraction in U.S. Pat. 2,844,484 as characterized by two intense lines quite close together with interplanar spacings of 3.46 A. and 3.19 A., a third line of similar intensity with an interplanar spacing of 14.24 A., two lines of moderate intensity with interplanar spacings of 6.32 A. and 7.13 A., and two weak lines with interplanar spacings of 5.30 A. and 4.27 A. This is a bluish red pigment of excellent strength and intensity and is the easiest of the three phases to obtain.

Another alpha phase is defined in U.S. Pat. 3,259,630 as having lines of strong intensity at interplanar space of 14.3 and 6.37 A.; three strong to medium reflections at 3.44, 3.37 and 3.23 A., three medium strong reflections at 3.54, 3.31 and 3.16 A., and four weak reflection at 7.14, 6.15, 5.54 and 3.72 A.

The beta phase is characterized by five well-defined lines corresponding to interplanar spacings of 15.23 A., 7.55 A., 5.47 A., 4.06 A. and 3.31 A. The lines with interplanar spacings of 15.23 A. and 3.31 A. are characteristically much stronger than the other three. This product is a violet pigment of excellent intensity and strength, exhibiting a high degree of resistance to change under various conditions. This is a valuable pigment by itself and also as a blending agent for use with blue pigments to obtain reddish hues.

The gamma phase is defined according to U.S. Pat. 2,844,581 as characterized by three strong lines with interplanar spacing of 13.58 A., 6.41 A., and 3.37 A. and three relatively weaker lines having interplanar spacings of 5.24 A., 4.33 A. and 3.74 A. This is a bluish red pigment of excellent strength and intensity and of outstanding resistance to change either on exposure to the elements, to solvents or to chemical reagents.

Another gamma phase which is yellowish red is characterized in U.S. 3,074,950 as having three strong lines at 6.5°, 13.7° and 26.4°, three medium lines at 13.1°, 13.3° and 23.8, and three weak lines at 17.0, 20.5° and 25.0°.

A delta phase is described in U.S. Pat. 3,272,821 as having a reddish color and being characterized by a very strong line at 13.6 A.; strong lines at 6.41 A. and 6.75 A.; medium lines at 3.34 A., 3.37 A., and 6.63 A.; and weak lines at 2.81 A., 2.95 A., 3.12 A., 3.18 A., 3.55 A., 3.74 A., 4.11 A., 4.36 A., and 5.23 A.

These quinacridones are desirable for use as pigments in paints, enamels, lacquers, plastics, etc., particularly because of their non-bleeding color, tinctorial strength, light fastness and durability for outside use with respect to gloss, film integrity and bronzing.

Since the crude quinacridones have little color value it is necessary to alter them to a suitable physical form, particularly with regard to particle size and shape in order to develop the desired pigmentary properties. This conditioning process can be carried out in several ways, a grinding or milling operation being commonly employed. It has been found that the addition of certain solvents having phase directing properties in the conditioning operation makes it possible to control the crystal form of the produced pigment.

For example, U.S. Pat. 2,844,484 teaches that the dry milling of linear quinacridone with an inorganic salt such as sodium chloride, produces the bluish red, alpha phase regardless of whether the starting material is alpha, beta or gamma phase.

Another Pat. No. 2,844,485, teaches that milling with an inorganic salt in the presence of an aromatic hydrocarbon or halogenated aromatic hydrocarbon liquid gives the violet, beta phase, again regardless of the starting phase. However, in attempting to follow the teaching of Pat. No. 2,844,485 for preparing the violet or beta phase by grinding with an inorganic salt in the presence of an aromatic hydrocarbon, namely xylene, it has been found that unless the starting material is a beta phase quinacridone, this "conditioning" produces the beta phase only under severe milling conditions.

A third patent, No. 2,844,581, teaches that a similar process using dimethylformamide produces the red, gamma phase, again regardless of the starting phase.

In accordance with the practice of this invention, it has now been found that condition gamma phase quinacridone can be produced from alpha or gamma quinacridone by milling or grinding with an inorganic salt, preferably sodium chloride, in the presence of pyridine or a homolog thereof at room temperature or above, advantageously above 50° C. and preferably in the range of 75–110° C.

The time required for milling or grinding depends upon the amount of material being conditioned and the type of apparatus being used. Generally, the period best suited to giving the desired particle size is sufficient. For suitable pigmentary properties, it is desirable that the particles have a size which gives a surface area greater than about 60 sqaure meters per gram (determined according to the nitrogen absorption method of Emmet: "Advances in Colloid Science," vol. 1, 1942).

Generally, with laboratory or pilot plant equipment a milling time of at least 40 hours, preferably at least 48 hours is desirable. Optimum results are obtained with a milling time of 48 to 72 hours. Grinding in excess of 72 hours gives only such slight improvement that it does not warrant the extra time. With more efficient plant size equipment, it is possible to use even shorter periods, possibly as short as 15 hours.

The inorganic salt used in the process of this invention can be of various types. Obviously, it must be stable against decomposition at the temperatures used for the grinding operation and should be soluble in water or dilute acid so as to be easily removable from the quinacridone. Advantageously, it should be one not having water of hydration which will be liberated during the grinding process. Because of its inexpensiveness and availability, sodium chloride is preferred. However, other salts such as potassium chloride, ammonium chloride, ammonium sulfate, sodium sulfate, etc. can be used. These can be of commercial grade, and any adsorbed moisture present can be removed by preheating the salt separate from the quinacridone prior to its use.

The proportion of salt to pigment can be varied widely, ranging from 4 to 20 parts of salt per part of pigment. Very satisfactory results are obtained with about 9–10 parts of salt. Smaller amounts of salt require longer milling periods while larger amounts give no added advantage and therefore are less economical.

Various types of mills can be used for the milling or grinding operation provided that they are equipped for maintaining the desired temperature. It is only necessary that in addition to maintaining the temperature, the mill provides the shearing or attrition necessary to produce the desired particle size. For example, a roller mill or an edge runner mill or ball mill can be used. Various balls, rolls, nails, etc. are advantageously used in addition to the salt for produciing the grinding effect. The grinding time will vary according to the particular type of mill and grinding material used .

In most of the examples described below, a quart steel jar having a lid thereon sealed by means of a silicone-rubber gasket is used. This is charged with 2500 grams of ⅝ inch diameter SKF balls. Suspended driven rollers or rolls on which the jar is rotated are contained in an oven maintained at the desired milling temperature. For the purpose of this invention, the optimum roll speed has been determined as such that will give the 5½" diameter quart jar a speed of about 106 r.p.m. Generally, however, a speed is used which will give suitable grinding action as determined for optimum ball mill operation. Obviously, other speeds can be used, with appropriate modification of rolling time, etc.

The pigment after grinding for the period appropriate to give the desired pigmentary properties is separated together with the salt from the grinding balls or rolls, etc. by means of a coarse sieve. The salt is then extracted with a hot dilute aqueous acid. In addition to dissolving the salt and pyridine, the acid removes any metal that may have been removed from the grinding media or the surface of the container.

Various means or methods can be used for supplying the heat and controlling the temperature during the grinding. Most advantageously, small mills are inserted into a furnace or oven maintained at the desired processing temperature, and rotated on driven rolls. However, other means of heating the mills can be provided. For example, radiant or gas flame means can be used for directing heat against the surface of the mill and the supply of heat adjusted according to the temperature recorded by a thermo-couple placed at an appropriate position on the mill. In the case of large mills it is necessary to supply cooling means to maintain the desired temperature. Depending on the particular size and conditions of milling appropriate means are provided to maintain the internal temperature of the mill within the desired range.

When the grinding is performed at lower temperatures such as room temperature the heat generated by the grinding, particularly in large mills requires cooling means to maintain whatever temperature is desired. Temperatures of about 90° C. are preferred due to the difficulty in maintaining temperatures below this level in large scale operations as a result of the heat generated by the grinding. At these temperature slightly brighter and cleaner shades are obtained, and there is a lesser tendency to cake in the mill.

In place of pyridine, there can also be used in this invention, the homologs of pyridine, such as quinolines and alkyl nuclear derivatives in which the alkyl groups have no more than 10 carbon atoms, preferably no more than 5. For example, quinoline, isoquinoline, methylquinoline, methylpyridine (picoline), ethypyridine, dimethylpyridine, diethylpyrideine, amylpyridine, octylpyridine and decylpyridine, amylquinoline, decylquinoline, etc. can be used. The pyridine, or homolog is used in an amount equivalent to 0.1–1.0 part of pyridine per part of the quinacridone. Larger amounts can be used but for economic reasons and since no added advantage is derived from larger amounts, the range specified is adequate.

Since various types of linear quinacridone starting materials can be used in the process of this invention, it is not critical that the quinacridone be prepared by any particular method. Various methods of preparing quinacridone are shown in the art. In the examples given below the crude quinacridone is prepared according to the procedure of U.S. Pat. 3,259,630.

The respective phases of the quinacridone are determined primarily by X-ray diffraction patterns. These X-ray diffraction patterns are obtained by the well-known powder technique using a Geiger counter to record the intensity of the refractive rays. In measuring these diffraction patterns, the intensities are adjusted so that the most intense band of each pattern is given a value of 100 in order that the respective patterns can be compared. The instrument records the intensity of the diffracted ray on the vertical axis and the angle of diffraction on the horizontal axis with CuK alpha radiation. This angle is converted to interplanar spacing expressed in Angstrom units. These values are accurate within 2% and in most cases the variance is less than 1%. These resultant patterns have certain similarities, because of the close identity of the phase but there are characteristic differences which identify the respective phases. These characteristic differences are enumerated above respectively for the alpha, beta, and gamma phases.

The invention is best illustrated by the following examples. These examples are given merely for the purpose of illustration and are not intended to limit the scope of the invention nor the manner in which it may be practiced. Parts and percentages are given by weight unless specifically provided otherwise.

EXAMPLE I

The following procedure is used in the various conditioning operations of this invention as referred to in subsequent examples.

The steel quart jar with grinding media, as described above, along with the pigment-salt mixture are dried thoroughly at above 100° C. to remove any residual moisture which may be present. The charge comprises 20 grams of the quinacridone and 180 grams of dry sodium chloride. With the charge dried as mentioned above, 4.3 grams of pyridine is added, the jar is sealed and placed immediately on the rolls in the oven.

The temperature and milling time are indicated in each example. The charge remains generally free flowing during the entire grinding operation and upon completion of the milling, the contents are discharged upon a coarse sieve which permits passage of the salt and pigment while retaining the SKF balls. The powdered product is dispersed in 500 ml. of water by means of a high speed mixer. The resultant fluid slurry is transferred to a beaker and agitated by means of a sweep type agitator. To this is added sufficient dilute sulfuric acid to yield 1000 ml. of 5% $H_2SO_4$.

The mixture is heated at 95° C. for 30 minutes after which the solids are filtered on a Buchner funnel and washed to neutrality with water. The filter cake is dispersed in water by mixing in the Waring Blendor for three minutes in sufficient water to yield a fluid slurry. This slurry is returned to the beaker and the water volume increased to 1000 ml. This is agitated and heated at 95–100° C. for 15 minutes, after which the solids are again filtered on a Buchner funnel and washed with water. The resultant filter cake generally has a solids content of approximately 30% and is suitable for any further processing desired. Results and characteristics of the products are given in the following respective examples.

EXAMPLE II

A number of experiments are performed using the procedure of Example I with variations in the temperature used. In each case, a crude alpha phase quinacridone, having the characteristic red color, is used and the mixture is milled for 48 hours at the indicated temperatures. The various temperatures used and the results obtained are tabulated below:

| Temp. 0 C. | Results and Comments |
|---|---|
| Room temp. | Red gamma phase. |
| 50° C. | Red gamma phase. |
| 75° C. | Red gamma phase—less tendency to cake. |
| 90° C. | Gives slightly brighter and cleaner red-less tendency to cake. |
| 100° C. | Gives slightly brighter and cleaner red-less tendency to cake. |
| 110° C. | Starting to shift to violet in shade. |
| 120° C. | Mostly violet. |

The X-ray diffraction pattern corresponds to that of the gamma phase described above, characterized by three strong lines with interplanar spacing of 13.58 A., 6.41 A., and 3.37 A. and three relatively weaker lines having interplanar spacings of 5.24 A., 4.33 A. and 3.74 A.

EXAMPLE III

When the procedure of Example II is repeated, varying the proportion of salt from 6 to 15 parts per part of sample, similar results are obtained as in Example II. Likewise, when temperatures of 85°, 95° and 105°, respectively, are used, similar results are obtained.

EXAMPLE IV

The procedure of Example II is repeated with similar results using individually in place of the pyridine, quinoline, picoline, dimethylpyridine, ethylpyridine and methylquinoline.

EXAMPLE V

The procedure of Example II is repeated a number of times at a milling temperature of 90° C. with variations in the amount of pyridine from 2.0 parts to 7.0 parts. The same results are obtained. At temperatures below 90° C. the lesser proportions of pyridine are preferred while at temperatures higher than 90° C., the higher proportions are more desirable.

EXAMPLE VI

The procedure of Example II is repeated using gamma quinacridone as the starting material. Conditioned gamma phase quinacridone is obtained.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. A process for preparing gamma crystal phase linear quinacridone pigment having an X-ray diffraction pattern exhibiting three strong lines corresponding to interplanar spacings of 13.58 A., 6.41 A. and 3.37 A., and three relatively weaker lines having interplanar spacing of 5.24 A., 4.33 A. and 3.7 A., which process comprises salt milling linear quanacridone with inorganic sealt, thermally stable and solid at the temperature of salt milling and soluble in aqueous solution and selected from the class consisting of ammonium chloride, ammonium sulfate and alkali metal and alkaline earth metal inorganic salts, and a liquid selected from the class consisting of pyridine, quinoline, isoquinoline, methyl quinoline, methyl pyridine, ethyl pyridine, dimethyl pyridine, amyl pyridine, diethyl pyridine and octyl quinoline, the amount of said liquid being 0.1–1.0 part by weight per part by weight of quinacridone, at a temperature of at least room temperature and no more than 110° C.

2. The process of claim 1 in which said milling is effected at a temperature of 75–110° C.

3. The process of claim 2 in which said salt is sodium chloride.

4. The process of claim 3 in which said liquid is pyridine.

5. The process of claim 4 in which said temperature is approximately 90° C.

6. The proces of claim 4 in which said milling is conducted for at least 48–72 hours.

7. The process of claim 4 in which said milling is conducted for at least 40 hours.

8. The process of claim 1 in which said inorganic salt is a water-soluble inorganic salt, and subsequently removing the salt from the quinacridone by dissolving said salt in an aqueous medium.

9. The process of claim 8 in which said inorganic salt is sodium chloride.

References Cited

UNITED STATES PATENTS

| | | | |
|---|---|---|---|
| 2,844,581 | 7/1958 | Manger et al. | 260—279 |
| 3,065,092 | 11/1962 | Geiger et al. | 260—314 X |
| 3,176,925 | 4/1965 | Huband et al. | 260—279 X |
| 3,201,051 | 8/1965 | Manger et al. | 241—22 |
| 3,256,285 | 6/1966 | Fuchs et al. | 260—279 |
| 3,296,008 | 1/1967 | Pugin | 106—288 |
| 2,982,666 | 5/1961 | Chun et al. | 260—279 |

DONALD G. DAUS, Primary Examiner

U.S. Cl. X.R.

106—288; 260—283, 290